United States Patent
Nolan (10) Patent No.: US 11,403,426 B1
(45) Date of Patent: Aug. 2, 2022

(54) SINGLE PATH PRIORITIZATION FOR A COMMUNICATION SYSTEM

(71) Applicant: Intercom, Inc., San Francisco, CA (US)

(72) Inventor: Eoin Nolan, Dublin (IE)

(73) Assignee: Intercom, Inc., San Francisco, CA (US)

(*) Notice: Subject to any disclaimer, the term of this patent is extended or adjusted under 35 U.S.C. 154(b) by 0 days.

(21) Appl. No.: 17/667,218

(22) Filed: Feb. 8, 2022

Related U.S. Application Data (60) Provisional application No. 63/244,147, filed on Sep. 14, 2021.

(51) Int. Cl.
*G06F 21/00* (2013.01)
*G06F 21/62* (2013.01)
*G06F 21/53* (2013.01)

(52) U.S. Cl.
CPC .......... *G06F 21/6272* (2013.01); *G06F 21/53* (2013.01); *G06F 21/6263* (2013.01)

(58) Field of Classification Search
None
See application file for complete search history.

(56) References Cited

U.S. PATENT DOCUMENTS

| 6,167,438 A * | 12/2000 | Yates .................... H04L 67/101 709/216 |
| 9,960,992 B2 * | 5/2018 | Khalil ..................... H04L 45/12 |
| 10,013,705 B2 * | 7/2018 | Mikurak ................ G06Q 50/12 |
| 10,869,199 B2 * | 12/2020 | Raleigh .................. H04W 8/18 |
| 2015/0304354 A1 * | 10/2015 | Rogers ............... H04L 63/1425 726/1 |
| 2019/0187690 A1 * | 6/2019 | Celia ..................... G06N 3/088 |
| 2022/0075793 A1 * | 3/2022 | Jezewski ................. G06N 5/04 |

* cited by examiner

*Primary Examiner* — Maung T Lwin
(74) *Attorney, Agent, or Firm* — Womble Bond Dickinson (US) LLP (57) ABSTRACT

A method and system includes identifying a user object at an initial node of a first user path. The method includes determining whether the first user path requires company prioritization responsive to identifying the user object at the initial node. The method includes determining whether the user object is linked to multiple companies responsive to determining that the first user path requires company prioritization. The method includes locking, by a processing device, a first company of the multiple companies to the user object in the first user path responsive to determining that the user object is linked to the multiple companies. The method includes verifying a data match for the first company of the user object at the initial node responsive to locking the first company to the user object. The method includes advancing the user object to a subsequent node of the first user path.

20 Claims, 7 Drawing Sheets

SINGLE PATH PRIORITIZATION FOR A COMMUNICATION SYSTEM

CROSS-REFERENCE TO RELATED APPLICATION

This application claims priority to, and benefit of, U.S. Provisional Patent Application No. 63/244,147, filed Sep. 14, 2021, the entire contents of which are hereby incorporated by reference.

TECHNICAL FIELD

The present disclosure relates to systems and methods for managing communications and, more specifically, systems and methods for managing communications with users and potential users of a system.

BACKGROUND

Customer relationship management (CRM) software is software that automates and manages interactions with a company. A conversational messaging system may allow a company to define conversational experiences for commerce, marketing, and support using in-product channels (e.g., chatbots, live messaging, banners) and out of product channels (e.g., email, short message service (SMS) messages). CRM software or conversational messaging systems may be used by a company to maintain contact with customers and quickly respond to their needs. CRM software or conversational messaging systems may be used by a company to increase engagement with the company.

SUMMARY

One aspect disclosed herein is directed to a method that includes identifying a user object at an initial node of a first user path. In some embodiments, the method includes determining whether the first user path requires company prioritization responsive to identifying the user object at the initial node. In some embodiments, the method includes determining whether the user object is linked to multiple companies responsive to determining that the first user path requires company prioritization. In some embodiments the method includes locking, by a processing device, a first company of the multiple companies to the user object in the first user path responsive to determining that the user object is linked to the multiple companies. In some embodiments, the method includes verifying a data match for the first company of the user object at the initial node responsive to locking the first company to the user object. In some embodiments, the method includes advancing the user object to a subsequent node of the first user path responsive to verifying the data match for the first company of the user object.

In another aspect, the present disclosure is directed to a system that includes a memory and a processing device that is operatively coupled to the memory. In some embodiments, the processing device identifies a user object at an initial node of the first user path. In some embodiments, the processing device determines whether the first user path requires company prioritization responsive to identifying the user object at the initial node. In some embodiments, the processing device determines whether the user object is linked to multiple companies responsive to determining that the first user path requires company prioritization. In some embodiments, the processing device locks a first company of the multiple companies to the user object in the first user path responsive to determining that the user object is linked to multiple companies. In some embodiments, the processing device verifies a data match for the first company of the user object responsive to locking the first company to the user object. In some embodiments, the processing device advances the user object to a subsequent node of the first user path responsive to verifying the data match for the first company of the user object.

In another aspect, the present disclosure is directed to a non-transitory computer-readable medium storing instructions that, when executed by a processing device, cause the processing device to identify a user object at an initial node of the first user path. In some embodiments the instructions may cause the processing device to determine whether the first user path requires company prioritization responsive to identifying the user object at the initial node. In some embodiments the instructions may cause the processing device to determine whether the user object is linked to multiple companies responsive to the first user path requiring company prioritization. In some embodiments the instructions may cause the processing device to lock a first company of the multiple companies to the user object in the first user path responsive to determining the user object being linked to multiple companies. In some embodiments the instructions may cause the processing device to verify a data match for the first company of the user object responsive to locking the first company to the user object. In some embodiments the instructions may cause the processing device to advance the user object to a subsequent node of the first user path responsive to verifying the data match for the first company of the user object.

It will therefore be appreciated that this Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

Further, to the extent consistent, any of the embodiments or aspects described herein may be used in conjunction with any or all of the other embodiments or aspects described herein.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements.

As used herein, the term "communication system" may refer to the system and/or program that manages communication between individuals and companies. The term "customer" may refer to a company or organization utilizing the communication system to manage relationships with its end users or potential end users (leads). The term "user" may refer to an end user or lead that is interfacing with the customer through the communication system. The term "company" may refer to an organization or business that includes a group of users. The term "engineer" may refer to staff managing or programing the communication system. The term "product" may refer to a website, application, or program of the customer.

As described in the below passages, the communication system may place (e.g., assign, allocate) user objects into user paths developed by the customer and monitors interaction of the users with a product of the customer. The user objects may be representative of users interacting with the product via a user device. The communication system may monitor and/or detect the interaction of the user with the customer and interact with the users to advance the user objects along the user paths based on conditions set by the customer. The interactions with the user may include, but not be limited to, chats, instant messages, text messages, and emails. The communication system may include reporting functions that allow a customer to monitor the status of user objects along the developed user paths.

Customers may store data on users and companies of the user in a customer data platform of a communication system. In some embodiments, a user object may be associated with one or more companies in the customer data platform. In certain embodiments, a user object may be associated with an employer, a customer of the user, a customer of the employer of the user, and/or an organization of the user or the employer of the user. When a user object is associated with a company, the user object may be linked to the company within data stored in the customer data platform.

A customer may elect to request information from a user or send a message to a user related to a company linked to the user. When a user is linked to a single company such request for information or a message is straight forward. That is, a request for information or a message is sent to the user device when the user object associated with the user device matches with a ruleset. In contrast, when a user object is linked to multiple companies, the communication system may send the same message to a user device for each company that is linked to the user object or in some instances it may be preferred to send a single message for a single company that is linked to the user object and prevent multiple messages being sent to the user device represented by the user object.

Existing systems address a user object being linked to multiple companies in two ways. First, some existing systems do not allow a user object to be linked to multiple companies. Second, some existing systems allow user objects to be linked to multiple companies but require a primary company to be selected or identified which will take priority over all other companies such that only requests or messages for the primary company will be sent in instances when multiple requests or messages are to be sent by the communication system. The first solution prevents a communication system from fully addressing the needs of its customers. The second solution may prevent requests or messages being sent when the information or message needs to be sent for each company.

This can be shown in an example where an example user object is linked to a first company, a second company, and a third company. The example user object may be a contractor that does work for each of the first company, the second company, and the third company. A customer may desire to send a request for tax information from the example user object for each of the companies linked to the example user object. In this instance, the first solution is inadequate because the example user object is only linked to a single company such that the example user object only gets the request for one of the three companies linked to the example user object. Similarly, the second solution is inadequate because the example user object only gets a request for the company that is selected as the primary company and does not receive a request for the other linked companies.

Aspects of the present disclosure address the above-noted and other deficiencies by disclosing a communication system that allows a user object to be linked to multiple companies and allows a customer to select to send a message to the user object for a single prioritized company linked to the user object or a message to the user object for each company linked to the user object. Allowing the customer to select to use company prioritization in a user path based on the focus of the user path provides increased flexibility to the customer and may increase a customer's perception of the communication system.

Allowing for company prioritization to be selected by a customer may reduce system resources required to operate a communication system. Allowing company prioritization may decrease network resources required by the communication system by reducing a number of messages sent to a user device across the network. Decreasing the network resources may decrease network bandwidth required to send communications to the user device. Decreasing the network bandwidth required to operate the communication system may reduce overall network congestion.

Figure 1A:
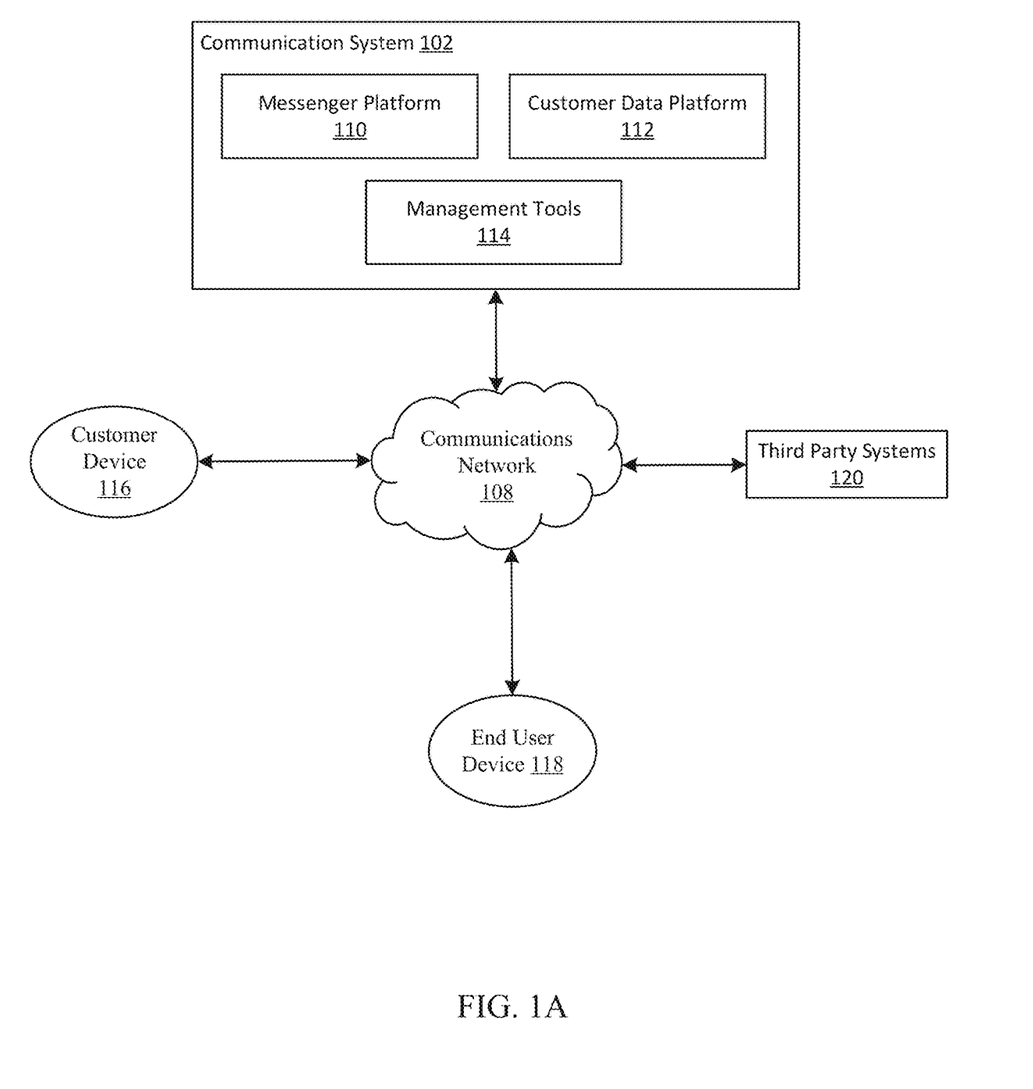
FIG. 1A is a block diagram depicting an example environment for managing communications with users and potential users of a communication system, according to some embodiments.

FIG. 1A is a block diagram depicting an example environment for managing communications with users and potential users of a communication system, according to some embodiments. As shown, the environment 100 includes a communication system 102 that is interconnected with a customer device 116, an end user device 118, and third party systems 120 via a communications network 108. The communications network 108 may be the internet, a wide area network (WAN), intranet, or other suitable network. The communication system 102 may be hosted on one or more local servers, may be a cloud based system, or may be a hybrid system with local servers and in the cloud. The communication system 102 is maintained by engineers which develop management tools 114 that include an interface or editor for clients of the communication system 102 to interface with the communication system 102.

The communication system 102 includes management tools 114 that are developed to allow customers to develop user series or user paths in the form of nodes and edges (e.g., connections) that are stored in a customer data platform 112 of the communication system 102. The communication system 102 includes a messenger platform 110 that interacts with end user devices 118 in accordance with the user paths stored in the customer data platform 112.

A customer interacts with the communication system 102 by accessing a customer device 116. The customer device 116 may be a general purpose computer or a mobile device. The customer device 116 allows a customer to access the management tools 114 to develop the user paths stored in the customer data platform 112. For example, the customer device 116 may execute an application using its hardware (e.g., a processor, a memory) to send a request to the communication system 102 for access to a graphical editor, which is an application programming interface (API) stored in the management tools 114. In response to receiving the request, the communication system 102 may send a software package (e.g., executable code, interpreted code, programming instructions, libraries, hooks, data, etc.) to the customer device 116 to cause the customer device 116 to execute the software package using its hardware (e.g., processor, memory). In some embodiments, the application may be a desktop or mobile application, or a web application (e.g., browser). The customer device 116 may utilize the graphical editor to build the user paths within the graphical editor. The graphical editor may periodically send copies (e.g., snapshots) of the user path as it is being built to the communication system 102, which in turn, may store the user paths to the customer data platform 112. The user paths manage communication of the customer with a user to advance a user object associated with the user through the user paths. The user paths may be developed to increase engagement of a user with the customer via the messenger platform 110.

The messenger platform 110 may interact with a user through an end user device 118 that accesses the communication network 108. The end user device 118 may be a general purpose computer or mobile device that accesses the communication network 108 via the internet or a mobile network. The user may interact with the customer via a website of the customer, a messaging service, or interactive chat. In some embodiments, the user paths may allow a customer to interface with users through mobile networks via messaging or direct phone calls. In some embodiments, a customer may develop a user path in which the communication system 102 interfaces with a user device via a non-conversational channel such as email.

The communication system 102 includes programs or workers that place user objects into the user paths developed by the customers stored in the customer data platform 112. The communication system 102 may monitor progress of the user objects through the user paths developed by the customer and interact with the customer based on the nodes and edges developed by the customer for each user path. In some embodiments, the communication system 102 may remove user objects from user paths based on conditions developed by the customer or by the communication system 102.

The communication system 102 and/or the customers may employ third party systems 120 to receive (e.g., retrieve, obtain, acquire), update, or manipulate (e.g., modify, adjust) the customer data platform 112 or user data which is stored in the customer data platform 112. For example, a customer may utilize a third party system 120 to have a client chat directly with a user via the end user device 118 or may utilize a bot (e.g., a software program that performs automated, repetitive, and/or pre-defined tasks) to interact with a user via the end user device 118 via chat or messaging.

Although FIG. 1A shows only a select number of computing devices and/or systems (e.g., communication system 102, customer device 116, third party systems 120, and end user device 118), the environment 100 may include any number of computing devices and/or systems that are interconnected in any arrangement to facilitate the exchange of data between the computing devices and/or systems.

Figure 1B:
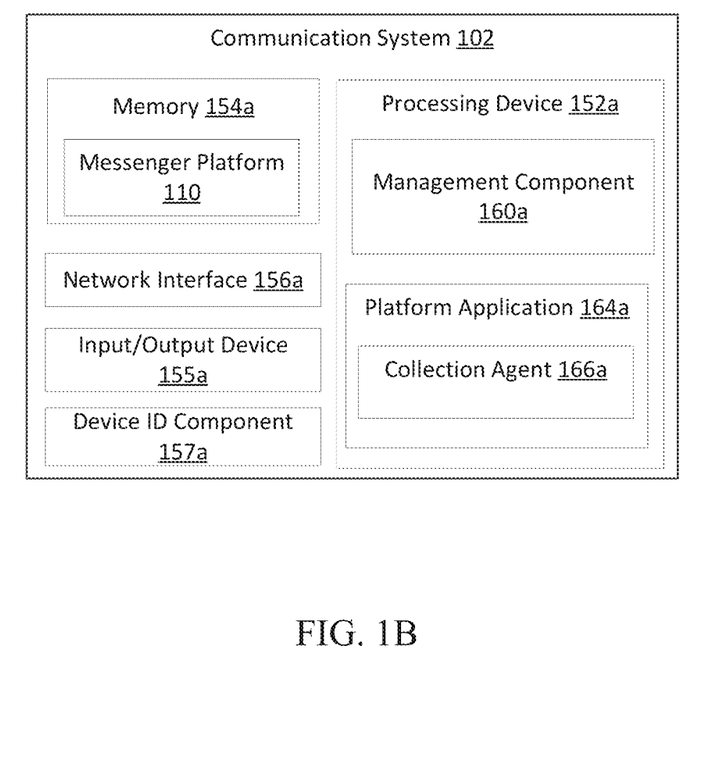
FIG. 1B is a block diagram depicting an example of the Communication System of FIG. 1A, according to some embodiments.

FIG. 1B is a block diagram depicting an example of a communication system 102 of FIG. 1A, according to some embodiments. While various devices, interfaces, and logic with particular functionality are shown, it should be understood that the communication system 102 includes any number of devices and/or components, interfaces, and logic for facilitating the functions described herein. For example, the activities of multiple devices may be combined as a single device and implemented on a same processing device (e.g., processing device 152a), as additional devices and/or components with additional functionality are included.

The communication system 102 includes a processing device 152a, a memory 154a, an input/output device 155a, a network interface 156a, and a device ID component 157a. The memory 154a may include the messenger platform 110 stored therein. The processing device 152a may include a management component 160a or a platform application 164a. The platform application 164a may include a collection agent 166a.

The processing device 152a of the communication system 102 may perform checks for the completion of a task. The task may be completed by the platform application 156 or the end user device 118. The processing device 152a may send messages to the end user device 118 responsive to the checks, e.g., the checks being true or false. The messages sent by the processing device 152a may be sent via an in-product channel or an out-of-product channel. In certain embodiments, the messages may be sent as an email. The processing device 152a may advance a user object through a user path executed by the processing device 152a.

The processing device 152a includes (e.g., general purpose processor, a PLD, etc.), which may be composed of one or more processors, and a memory 154a (e.g., synchronous dynamic random access memory (DRAM), read-only memory (ROM)), which may communicate with each other via a bus (not shown).

The processing device 152a may be provided by one or more general-purpose processing devices such as a microprocessor, central processing unit, or the like. In some embodiments, processing device 152a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 152a may comprise one or more special-purpose processing devices such as an application specific integrated circuit (ASIC), a field programmable gate array (FPGA), a digital signal processor (DSP), network processor, or the like. The processing device 152a may be configured to execute the operations described herein, in accordance with one or more aspects of the present disclosure, for performing the operations and steps discussed herein.

The processing device 152a may include and/or execute an application (shown in FIG. 1B as, "platform application 164a") that is displayed on a computer screen of the communication system 102. In some embodiments, the platform application 164a may be an application that is or has undergone one or more stages of a software development process for the purpose of developing the application into a final product for private use, public use, and/or commercial use. In some embodiments, the platform application 164a may be configured to need one or more computing resources (e.g., networking resources, data storage resources, processing resources, one or more files) in order to completely execute (e.g., execute without error and/or interruption). In some embodiments, the platform application 164a may be configured to send a communication, via the communications network 108 (shown in FIG. 1A) to the customer device 116 or the end user device 118.

The platform application 164a may include a collection agent 166a. The collection agent 166a may include an application plug-in, application extension, subroutine, browser toolbar, daemon, or other executable logic for collecting data processed by the platform application 164a and/or monitoring interactions of the end user device 118. In other embodiments, the collection agent 166a may be a separate application, service, daemon, routine, or other executable logic separate from the platform application 164a but configured for intercepting and/or collecting data processed by platform application 164a, such as a screen scraper, packet interceptor, application programming interface (API) hooking process, or other such application. The collection agent 166a may capture interactions with a product, e.g., a website, an application, or a program, by the end user device 118. In some embodiments, the collection agent 166a generates collection data based on communications received from end user device 118 via the network interface 156a by way of the communications network 108.

The processing device 152a may execute a management component 160a. In some embodiments, the management component 160a may be configured to launch and/or execute a user path. In some embodiments, the management component 160a may be configured to launch (e.g., start, trigger, activate) the platform application 164a to cause platform application 164a to execute on the processing device 152a. The management component 160a may identify and move user objects representative of a user interfacing with the communication system 102 via an end user device 118 through the user paths. At times, the user paths and/or the user objects may store in the memory 154a.

The memory 154a (e.g., Random Access Memory (RAM), Read-Only Memory (ROM), Non-volatile RAM (NVRAM), Flash Memory, hard disk storage, optical media, etc.) stores data and/or computer instructions/code for facilitating at least some of the various processes described herein. The memory 154a includes tangible, non-transient volatile memory, or non-volatile memory. The memory 154a stores programming logic (e.g., instructions/code) that, when executed by the processing device 152a, controls the operations of the communication system 102. In some embodiments, the processing device 152a and the memory 154a form various processing devices and/or circuits described with respect to the communication system 102. The instructions include code from any suitable computer programming language such as, but not limited to, C, C++, C#, Java, JavaScript, VBScript, Perl, HTML, XML, Python, TCL, and Basic.

The communication system 102 includes a network interface 156a configured to establish a communication session with a computing device for sending and receiving data over the communication network 108 to the computing device. Accordingly, the network interface 156a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the communication system 102 includes a plurality of network interfaces 156a of different types, allowing for connections to a variety of networks, such as local area networks (public or private) or wide area networks including the Internet, via different sub-networks.

The communication system 102 may include an input/output device 155a configured to receive input from and provide information to engineers. In this regard, the input/output device 155a is structured to exchange data, communications, instructions, etc. with an input/output component of the communication system 102. Accordingly, input/output device 155a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the communication system 102, such as a built-in display, touch screen, microphone, etc., or external to the housing of the communication system 102, such as a monitor connected to the communication system 102, a speaker connected to the communication system 102, etc., according to various embodiments. In some embodiments, the communication system 102 includes communication circuitry for facilitating the exchange of data, values, messages, and the like between the input/output device 155a and the components of the communication system 102. In some embodiments, the input/output device 155a includes machine-readable media for facilitating the exchange of information between the input/output device 155a and the components of the communication system 102. In still another embodiment, the input/output device 155a includes any combination of hardware components (e.g., a touchscreen), communication circuitry, and machine-readable media.

The communication system 102 includes a device identification component 157a (shown in FIG. 1B as device ID component 157a) configured to generate and/or manage a device identifier associated with the communication system 102. The device identifier may include any type and form of identification used to distinguish the communication system 102 from other computing devices. In some embodiments, to preserve privacy, the device identifier may be cryptographically generated, encrypted, or otherwise obfuscated by any device and/or component of communication system 102. In some embodiments, the communication system 102 may include the device identifier in any communication (e.g., establish connection request, resource request) that the communication system 102 sends to a computing device.

The communication system 102 includes a bus (not shown), such as an address/data bus or other communication mechanism for communicating information, which interconnects the devices and/or components of communication system 102, such as processing device 152a, memory 154a, network interface 156a, input/output device 155a, device ID component 157a, and management component 160a.

In some embodiments, some or all of the devices and/or components of the communication system 102 may be implemented with the processing device 152a. For example, the messenger platform 110 may be implemented as a software application stored within the memory 154a and executed by the processing device 152a. Accordingly, such embodiments can be implemented with minimal or no additional hardware costs. In some embodiments, any of these above-recited devices and/or components rely on dedicated hardware specifically configured for performing operations of the devices and/or components.

Figure 1C:
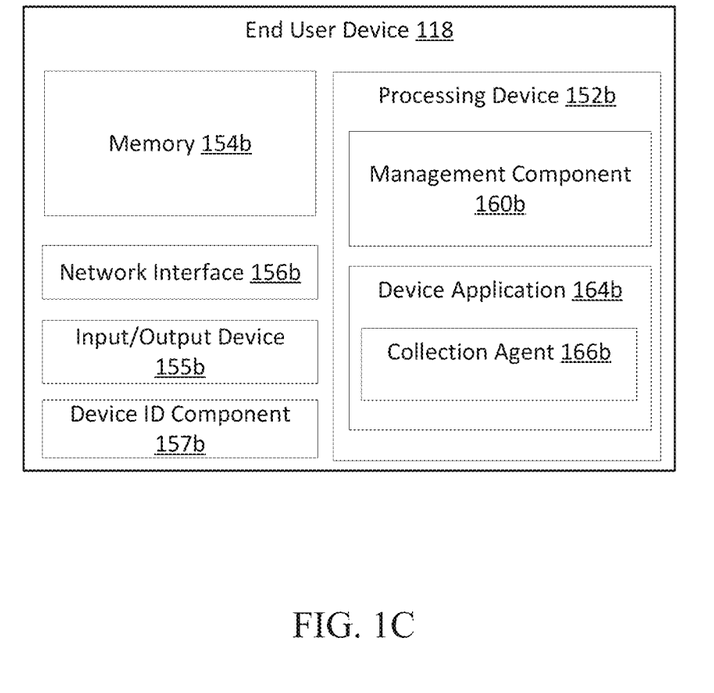
FIG. 1C is a block diagram depicting an example of the end user device of FIG. 1A, according to some embodiments.

FIG. 1C is a block diagram depicting an example of an end user device of FIG. 1A (e.g., end user device 118) of the environment in FIG. 1, according to some embodiments. While various devices, interfaces, and logic with particular functionality are shown, it should be understood that the end user device 118 includes any number of devices and/or components, interfaces, and logic for facilitating the functions described herein. For example, the activities of multiple devices may be combined as a single device and implemented on a same processing device (e.g., processing device 152b), as additional devices and/or components with additional functionality are included.

The end user device 118 includes a processing device 152b, a memory 154b, an input/output device 155b, a network interface 156b, and a device ID component 157b. The processing device 152b may include a management component 160b or a device application 164b. The device application 164b may include a collection agent 166b.

The end user device 118 includes the processing device 152b (e.g., general purpose processor, a PLD, etc.), which may be composed of one or more processors. The processing device 152b includes identical or nearly identical functionality as processing device 152a in FIG. 1B, but with respect to devices and/or components of the end user device 118 instead of devices and/or components of the communication system 102.

The processing device 152b may execute a device application 164b that is communicably coupled to the communication network 120 allowing the end user device 118 to send/receive data (e.g., requests, end user data, application data, user inputted data, etc.) to any other computing devices connected to the communication network 120. The device application 164b is configured to display information (e.g., application data) that the end user device 118 receives from any other computing device (e.g., communication system 102). The device application 164b may be an internet/web browser, a graphic user interface (GUI), an email reader/ client, a file transfer protocol (FTP) client, a virtual machine application, or a software application that is spate from an internet/web browser. The device application 164 may be or interact with a product monitored by the collection agent 166a of the communication system 102.

The device application 164b includes a collection agent 166b. The collection agent 166b may include an application plug-in, application extension, subroutine, browser toolbar, daemon, or other executable logic for collecting data processed by the device application 164b and/or monitoring interactions of user with the input/output device 155b. In other embodiments, the collection agent 166b may be a separate application, service, daemon, routine, or other executable logic separate from the device application 164b but configured for intercepting and/or collecting data processed by device application 164b, such as a screen scraper, packet interceptor, application programming interface (API) hooking process, or other such application. The collection agent 166a is configured for intercepting or receiving data input via the input/output device 157b, including mouse clicks, scroll wheel movements, gestures such as swipes, pinches, or touches, or any other such interactions; as well as data received and processed by the device application 164b. The collection agent 166b is configured to pass any data that it intercepts, gathers, and/or receives data to the device application 164b to be presented in the device application 164b (e.g., on a display/monitor) and/or for the application to sends the data to the communication system 102. In some embodiments, the collection agent 116b may be embedded in code received by and executed by the device application 164b. When executed, the collection agent 116b may gather and generate engagement information or data from the end user device 118 representative of activity of a user with the end user device 118 and/or engagement of the user with a product. The collection agent 116b may transmit the engagement data with the collection agent 166a of the communication system 102 via the network interface 156a by way of the communication network 108. The collection agent 116b, may begin intercepting, gathering, and/or receiving data input via its respective input/output circuit in view of any triggering event, including, e.g., a power-up of the end user device 118 or a launch of any software application executing on a processing device of end user device 118. In some embodiments, the collection agent 166b may begin intercepting, gathering, and/or receiving data responsive to a user scanning a quick response (QR) code associated with a product identifier or a barcode associated with a product identifier.

The memory 154b stores data and/or computer instructions/code for facilitating at least some of the various processes described herein. The memory 154b includes identical or nearly identical functionality as the memory 154a in FIG. 1B, but with respect to devices and/or components of the end user device 118 instead of devices and/or components of the communication system 102.

The end user device 118 includes a network interface 156b configured to establish a communication session with a computing device for sending and receiving data over a network to the computing device. Accordingly, the network interface 156a includes identical or nearly identical functionality as the network interface 156a in FIG. 1B, but with respect to devices and/or components of the end user device 118 instead of devices and/or components of the communication system 102.

The input/output device 155b may be similar to the input/output device 155a in FIG. 1B, but with respect to devices and/or components of the end user device 118 instead of devices and/or components of the communication system 102.

The device identification component 157b may be similar to the device identification component 157a in FIG. 1B, but with respect to devices and/or components of the end user device 118 instead of devices and/or components of the communication system 102.

Customers may store data on users and companies of the user in the customer data platform 112. A user may be represented in the customer data platform 112 by a user object. In some embodiments, a user object may be associated with one or more companies in the customer data platform 112. In certain embodiments, a user object may be associated with an employer, a client of the user, a client of an employer of the user, and/or an organization of the user or the employer of the user. When a user object is associated with a company, the user object may be linked to the company within data stored in the customer data platform 112.

Figure 2:
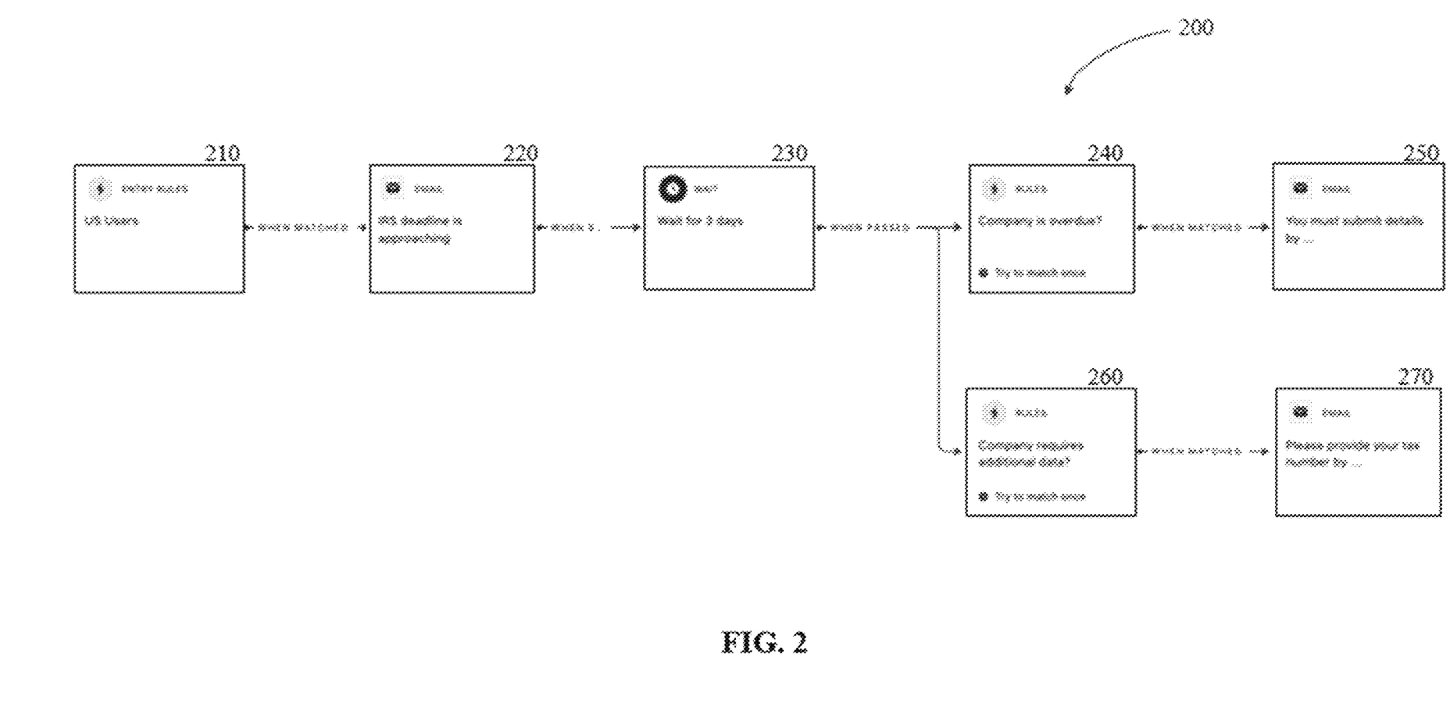
FIG. 2 is a block diagram of an example user path for providing messages to a user, according to some embodiments.

With reference to FIG. 2, is a block diagram of an example user path 200 for providing messages to a user device, according to some embodiments. The user path 200 includes a first node 210 that includes a match rule for entering the user path 200. When a user object matches the rule of the first node 210, the user object may be placed in the user path. When the user object is placed at the first node 210 and matches the rule of the first node 210, the user object may be advanced to the second node 220. The second node 220 may include a task related to the user object. As shown, the second node 220 includes a message to be sent to an end user device 118 associated with the user object.

When the task associated with the second node 220 is completed, e.g., the message is sent to the end user device 118, the user object may be advanced to the third node 230. The third node 230 may include a delay or wait period for the user object. After the wait period of the third node 230 elapses, the user object may be advanced to a fourth node 240 and/or to a sixth node 260. The fourth node 240 and/or the sixth node 260 may each include a match rule. When the user object matches the rule of the fourth node 240, the user is advanced to the fifth node 250. The fifth node 250 may include an associated task, e.g., a message may be sent to the end user device 118 at the fifth node 230. When the user matches the rule of the sixth node 260, the user object may be advanced to the seventh node 270. The seventh node 270 may include an associated task, e.g., a message may be sent to the end user device 118 at the seventh node 270. The task of the fifth node 250 may be different from the task of the seventh node 270.

The match rule for the fourth node 240 may be the same or different from the match rule of the sixth node 260. As shown, the user object may be simultaneously advanced to the fourth node 240 and the sixth node 260. In some embodiments, the user object may match the rule of the fourth node 240 or may match the rule of the sixth node 260 without matching the rule of the other of the fourth node 240 and the sixth node 260. In certain embodiments, the user object may match the rule of the fourth node 240 and the sixth node 260. If the user object does not match the rule of the fourth node 240 or the sixth node 260, the user object may remain at the respective one of the fourth node 240 or the sixth node 260.

As shown, the user object may take one of two concurrent paths in the middle of the user path 200, e.g., fourth node 240 and sixth node 260. The user object may match the fourth node 240 for a first company and may match the sixth node 260 for a second company. As a result, the message associated to the fifth node 250 may be sent to the end user device 118 for the first company and the message associated to the seventh node 270 may be sent to the end user device 118 for the second company. However, when the user path 200 requires company prioritization as detailed below, the match of the fourth node 240 or the sixth node 260 will only match a priority company of the user object. As such, the message associated with the fifth node 250 or seventh node 270 will only be sent if the priority company of the user object matches the fourth node 240 or the sixth node 260, respectively.

In some embodiments, it may be important for a customer to provide a message to an end user device 118 for each company linked to a user object. For example, when a customer is requesting information or providing an invoice, it may be beneficial if not necessary to send a message to an end user device 118 for each company linked to the user object.

In other embodiments, sending a message to the end user device 118 for each company linked to a user object may be confusing to a user or may be seen as spammy or annoying to a user. For example, when a user object is advancing through a user path, e.g., user path 200, and a banner is launched on the page as a result of a match of the user object, if a banner is launched for each company associated with the user object, multiple banners may be annoying or be seen as spam. As a result, a user interfacing with the end user device 118 may disengage from the webpage, program, or application.

Figure 3:
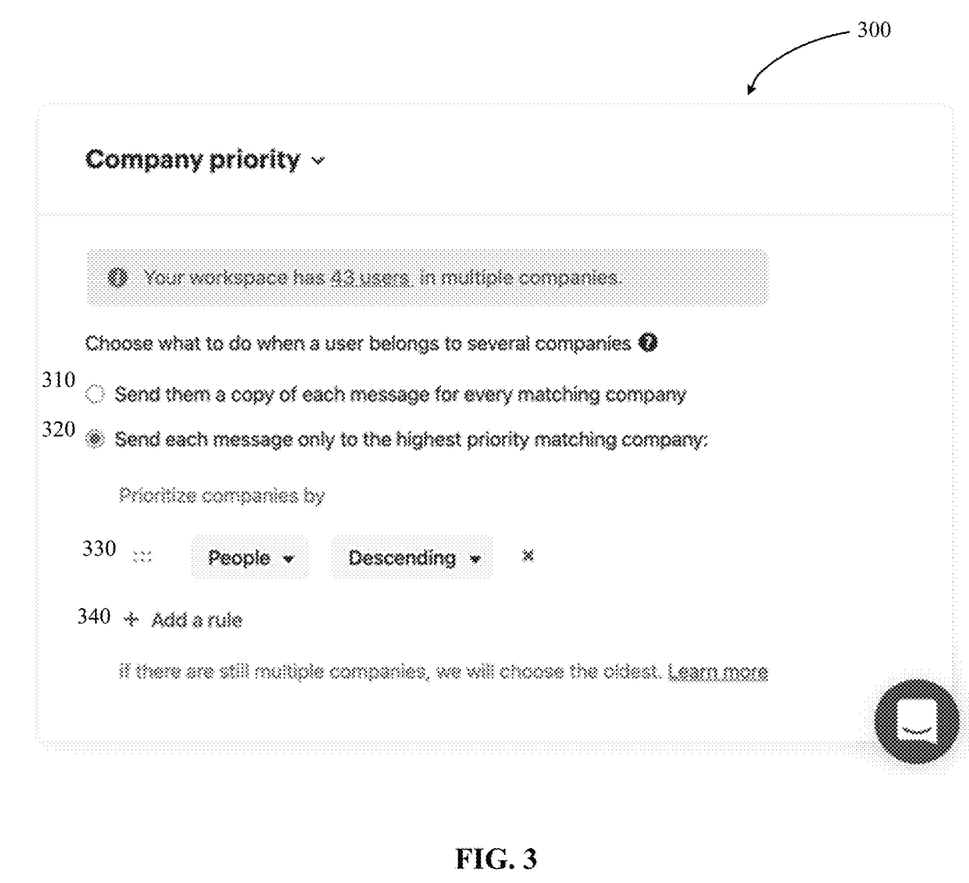
FIG. 3 is a block diagram of an example interface for providing selecting prioritization of companies is described, according to some embodiments.

With additional reference to FIG. 3, a block diagram of an example interface 300 for selecting prioritization of companies is described, according to some embodiments, with reference to the communication system 102 of FIG. 1 and the user path 200 of FIG. 2. The interface 300 shows a control window that may be used to select a company prioritization model for one or more of the nodes of the user path 200 or the entire user path 200. In some embodiments, the selected company prioritization model may be applied to a workspace including a plurality of user paths such that the company prioritization of a user objet is fixed for the entire workspace. The interface 300 allows a customer to select how the user path 200 will treat messages for a user object when a user object is linked to multiple companies. The interface 300 includes a first option 310 and a second option 320. When the first option 310 is selected an end user device associated with the user object will advance through a user path for each company matching the entry rules and may pass through a user path multiple times with each time being for a different company linked to the user object. As a result, the end user device 118 associated with the user object may receive a message multiple times with each occurrence being from a different company linked to the user object.

In contrast, the second option 320 enables company prioritization such that the end user device 118 will only receive the message for a priority company linked to the user object. The second option 320 includes criteria 330 for prioritizing the companies by a plurality of benchmarks including, but not limited to, a number of people in the company, a revenue of the company, sales to the company, a number of user objects of the company, an age of the company, or a number of linked user objects to the company. The second option 340 may include an ability to include multiple sorting criteria to identify a priority company. When a priority company is identified, the priority company is locked to the user object for the user path, node, or workspace such that the end user device 118 associated with the user object will only advance through a user path or receive messages for the priority company when a user path, node, or workspace has company prioritization enabled or selected.

Once a priority company is locked for a user object for a respective user path, node, or workspace, the priority company remains locked for the user object for the respective user path, node, or workspace. In some embodiments, a client may create a workspace that includes multiple user paths with the priority company being locked to the user object for the entire workspace such that the priority company may be locked to the user in multiple user paths. Locking the priority company to the user object prevents more than one company from being considered for the user for the particular workspace, user path, or node. This is important as the communication system 102 may be a distributed system with the user object moving through multiple user paths simultaneously. Locking the priority company to the user object may cause a match to fail at a node for a non-priority company. This may alert the communication system 102 that the user object is locked to a different company. The communication system 102 may attempt to rematch the node or may remove the user object from the user path for the non-priority company.

As noted above, the control interface 300 allows customers to choose to match a user object for each company linked to the user object or to match the user object only for a priority company linked to the user object. Allowing a customer to choose how to treat matches for a workspace, user path, or node in this manner may provide for increased flexibility for the communication system. Allowing a customer to choose how to treat matches in this manner may be less restrictive than other communication systems.

Figure 4:
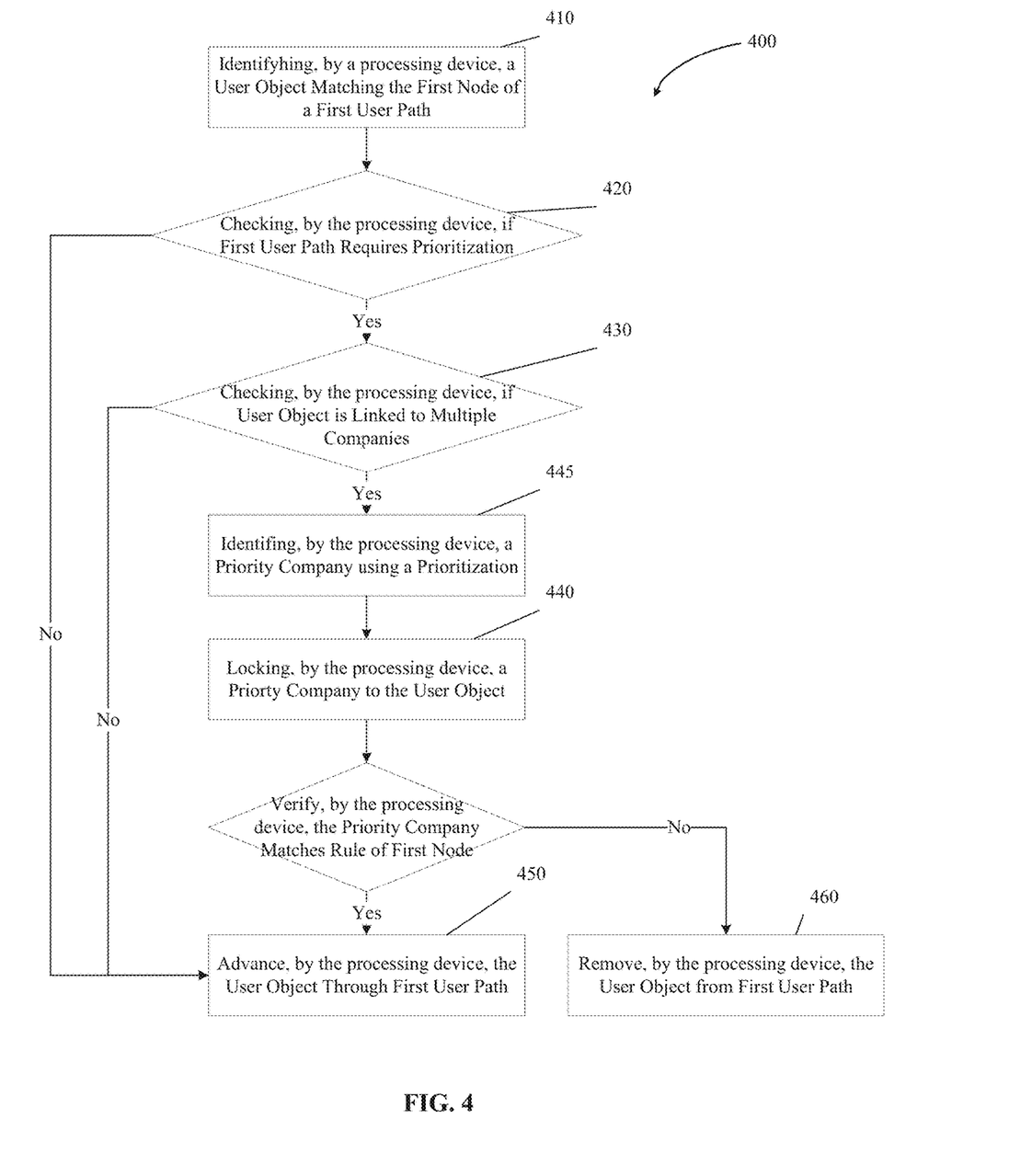
FIG. 4 is a flow chart of a method of processing a user through a first user path of a communication system, according to some embodiments.

Referring to FIG. 4, a flow chart of a method 400 of processing a user object through a first user path of a communication system, according to some embodiments, is described with reference to the communication system 102 of FIG. 1 and the user path 200 of FIG. 2. The user path 200 may be stored in the customer data platform 112 of the communication system 102. The processing device 152a of the communication system 102 matches user objects with rules of the user path 200. As shown, the processing device 152a identifies user objects that match a rule of the first node 210 of the user path 200 such that the user objects enter or are placed in the user path 200 (Operation 410).

When a user object is placed in the user path 200, the processing device 152a may check if the user path 200 or if any nodes of the user path 200 require company prioritization (Operation 420). In some embodiments, the requirement for company prioritization may be a filter being enabled for the user path 200. The filter may check for a prioritization flag being enabled for the user object. In some embodiments, a node requiring a company rule or a priority company match may be deep in the user path, e.g., sixth node 260, such that a user object may enter and be advanced through the user path without matching or identifying a priority company until reaching a node with a company rule. In such embodiments, the node requiring the company rule, e.g., sixth node 260, may be treated as an entry node or the first node as described herein.

The user path 200 or nodes of the user path 200 may include a filter or an identifier for the processing device 152a to indicate company prioritization for a user object within the user path 200. When the user path 200 does not require company prioritization, the processing device 152a may advance the user object through the first user path 200 without filtering or identifying a priority company for the user object (Operation 450).

When the user path 200 requires company prioritization, the processing device 152a, may check if the user object is linked to multiple companies within the customer data platform 112 (Operation 430). When the user object is linked to a single company or no company, the processing device 152a may advance the user object through the first user path 200 identifying the single company as the priority company or without identifying a priority company for the user object (Operation 450). When the user object is linked to multiple companies and the user path 200 requires company prioritization, the processing device 152a applies a prioritization rule to identify a priority company for the user object (Operation 445). When the priority company is identified, the priority company is locked to the user object (Operation 440). In some embodiments, when a user object enters a user path 200, an entry record is created for the user object. The entry record may include a "locked_company_id" which includes an ID for the company locked to the user object. Storing the locked_company_id in the entry record may allow for different priority companies for different user paths for a particular user. As noted above, the priority company may be locked to the user object for a user path, a single node, or a workspace.

When the priority company is locked to the user object, the processing device 152a may check to confirm that the priority company matches the rule of the first node 210. When the user object matches the rule for the priority company, the user object may be advanced through the user path 200 (Operation 450). When the priority company does not match the matched company, the processing device 152a may remove the user object from the user path 200 (Operation 460).

The method 400 allows the communication system 102 to be flexible to the needs of a customer. The method 400 allows a client to select a user path to require prioritization or to allow a user object to receive the same message from multiple linked companies. The method 400 allows the communication system 102 to be flexible to allow a customer to build a user path based on the needs of the customer.

Allowing for company prioritization to be selected by a customer may reduce system resources required to operate a communication system. Allowing company prioritization may decrease network resources required by the communication system by reducing a number of messages sent to a user device across the network. Decreasing the network resources may decrease network bandwidth required to send communications to the user device. Decreasing network bandwidth may reduce overall network congestion.

Figure 5:
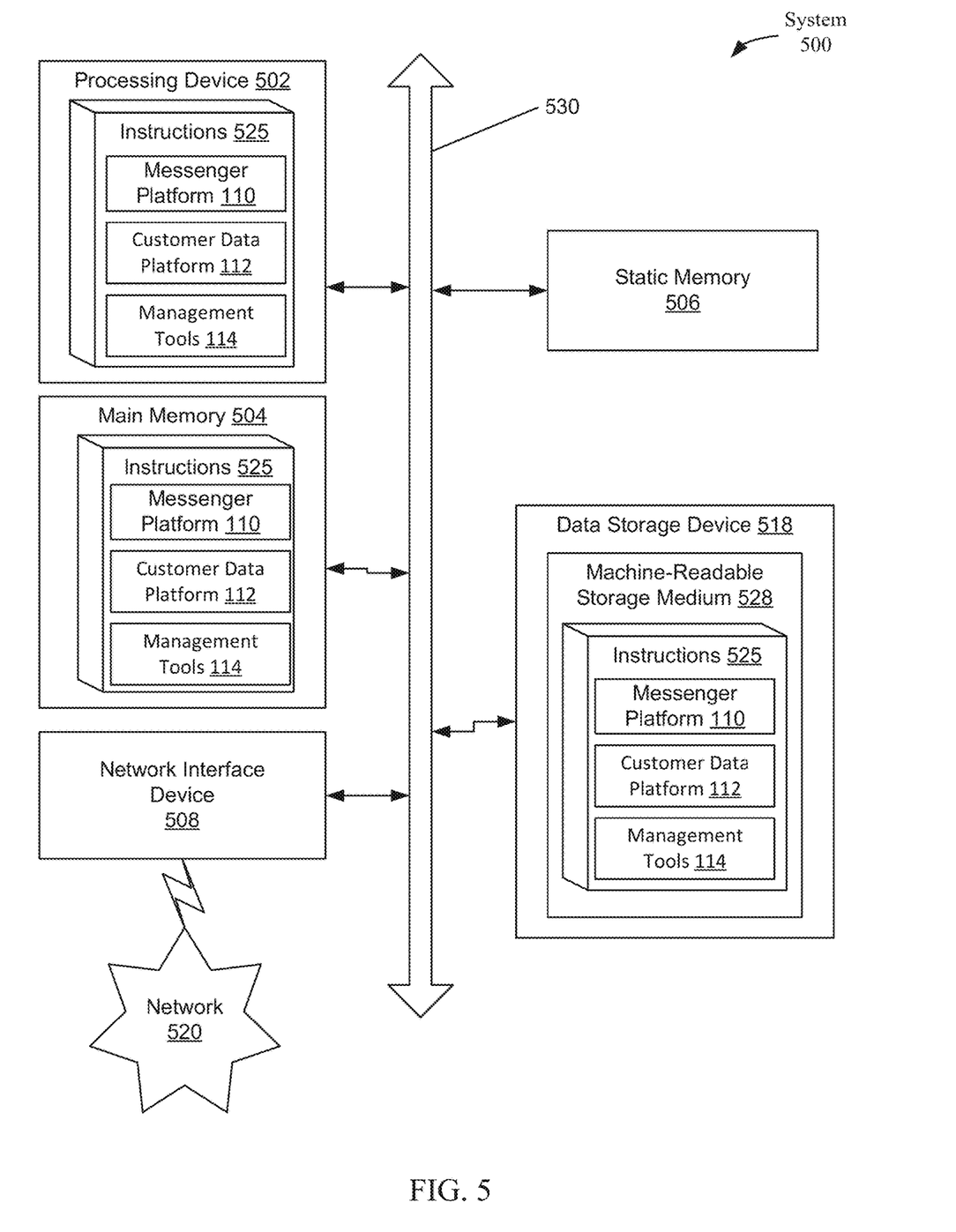
FIG. 5 is a block diagram of an example computing device 500 that may perform one or more of the operations described herein, according to some embodiments.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. In some embodiments, while only a single computing device is illustrated, the term "computing device" may be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may include a network interface device 508 which may communicate with a communication network 520. The computing device 500 may include a video display unit (e.g., a liquid crystal display (LCD) or a cathode ray tube (CRT)), an alphanumeric input device (e.g., a keyboard), a cursor control device (e.g., a mouse) and an acoustic signal generation device (e.g., a speaker). In one embodiment, video display unit, alphanumeric input device, and cursor control device may be combined into a single component or device (e.g., an LCD touch screen).

Data storage device 518 may include a computer-readable storage medium 528 on which may be stored one or more sets of instructions 525 that may include instructions for one or more components (e.g., messenger platform 110, the customer data platform 112, and the management tools 114) for carrying out the operations described herein, in accordance with one or more aspects of the present disclosure. Instructions 525 may reside, completely or at least partially, within main memory 504 and/or within processing device 502 during execution thereof by computing device 500, main memory 504 and processing device 502 constituting computer-readable media. The instructions 525 may be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" may be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Examples described herein may relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. The terms "comprises", "comprising", "includes", and/or "including", when used herein, may specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

In some embodiments, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware, for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in a manner that is capable of performing the task(s) at issue. "Configured to" may include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method comprising:
   identifying a user object at an initial node of a first user path;
   determining whether the first user path requires company prioritization responsive to identifying the user object at the initial node;
   determining whether the user object is linked to multiple companies responsive to determining that the first user path requires company prioritization;
   locking, by a processing device, a first company of the multiple companies to the user object in the first user path responsive to determining that the user object is linked to the multiple companies;
   verifying a data match for the first company of the user object at the initial node responsive to locking the first company to the user object; and
   advancing the user object to a subsequent node of the first user path responsive to verifying the data match for the first company of the user object.

2. The method of claim 1, further comprising:
   advancing the user object to the subsequent node of the first user path responsive to determining that the first user path does not require company prioritization.

3. The method of claim 1, further comprising:
   advancing the user object to the subsequent node of the first user path responsive to determining that the user object is not linked to the multiple companies.

4. The method of claim 1, further comprising:
   locking the first company to the user object for a plurality of user paths comprising the first user path.

5. The method of claim 1, further comprising:
   removing the user object from the first user path responsive to verifying a failure of the data match for the first company.

6. The method of claim 1, further comprising:
   placing the user object at a second node of a second user path responsive to verifying an additional data match for a second company of the user object;
   determining whether the second user path requires company prioritization responsive to identifying the user object at the second node;
   verifying the additional data match for the second company of the user object responsive to determining that the second user path requires company prioritization;
   advancing the user object to a subsequent node of the second user path responsive to verifying the additional data match for the second company of the user object;
   removing the user object from the second user path responsive to the additional data match not being verified for the second company of the user object;
   advancing the user object to the subsequent node of the second user path responsive to determining that the second user path does not require company prioritization; and
   sending a single message associated with the subsequent node of the second user path to the user object responsive to the user object being advanced to the subsequent node of the second user path.

7. The method of claim 1, further comprising:
   placing the user object at a second node of a second user path responsive to verifying an additional data match for the user object;
   determining whether the second user path requires company prioritization; and
   locking a second company to the user object in the second user path responsive to determining that the second user path requires company prioritization.

8. The method of claim 7, further comprising:
   verifying the additional data match for the second company of the user object, and
   advancing the user object to a subsequent node of the second user path responsive to verifying the data match for the second company or removing the user object from the second user path responsive to verifying a failure of the additional data match for the second company.

9. The method of claim 7, wherein the first company is the second company.

10. The method of claim 1, further comprising:
    identifying the first company based on at least one of a number of people in the first company, a revenue of the first company, sales to the first company, a number of user objects of the first company, an age of the first company, or a number of linked user objects to the first company.

11. A system comprising:
    a memory; and
    a processing device, operatively coupled to the memory, to:
      identify a user object at an initial node of a first user path;
      determine whether the first user path requires company prioritization responsive to identifying the user object at the initial node;
      determine whether the user object is linked to multiple companies responsive to determining that the first user path requires company prioritization;
      lock a first company of the multiple companies to the user object in the first user path responsive to determining that the user object is linked to multiple companies;
      verify a data match for the first company of the user object responsive to locking the first company to the user object; and
      advance the user object to a subsequent node of the first user path responsive to verifying the data match for the first company of the user object.

12. The system of claim 11, wherein the processing device is further to advance the user object to the subsequent node of the first user path responsive to determining the first user path does not require company prioritization.

13. The system of claim 11, wherein the processing device is further to advance the user object to the subsequent node of the first user path responsive to determining that the user object is not linked to multiple companies.

14. The system of claim 11, wherein the processing device is further to:
lock the first company to the user object for a plurality of user paths comprising the first user path.

15. The system of claim 11, wherein the processing device is further to:
place the user object at a second node of a second user path responsive to verifying an additional data match for a second company of the user object;
determine whether the second user path requires company prioritization responsive to identifying the user object at the second node;
verify the additional data match for the second company of the user object responsive to determining the second user path requires company prioritization:
advance the user object to a subsequent node of the second user path responsive to verifying the additional data match for the second company of the user object;
remove the user object from the second user path responsive to the additional data match not being verified for the second company of the user object;
advance the user object to the subsequent node of the second user path responsive to determining that the second user path does not require company prioritization; and
send a single message associated with the subsequent node of the second user path to the user object responsive to advancing the user object to the subsequent node of the second user path.

16. The system of claim 11, wherein the processing device is further to:
place the user object at a second node of a second user path responsive to verifying an additional data match for the user object;
determine whether the second user path requires company prioritization responsive to identifying the user object at the second node; and
lock a second company to the user object in the second user path responsive to determining that the user object is linked to the multiple companies.

17. The system of claim 16, wherein the processing device is further to:
verify the additional data match for the second company of the user object responsive to locking the second company to the user object; and
advance the user object to a subsequent node of the second user path responsive to verifying the data match for the second company or remove the user object from the second user path responsive to verifying a failure of the data match for the second company.

18. The system of claim 16, wherein the first company is the second company.

19. The system of claim 11, wherein the processing device is further to:
identify the first company based on at least one of a number of people in the first company, a revenue of the first company, sales to the first company, a number of user objects of the first company, an age of the first company, or a number of linked user objects to the first company.

20. A non-transitory computer-readable medium storing instructions that, when executed by a processing device, cause the processing device to:
identify a user object at an initial node of a first user path;
determine whether the first user path requires company prioritization responsive to identifying the user object at the initial node;
determine whether the user object is linked to multiple companies responsive to determining that the first user path requires company prioritization;
lock, by the processing device a first company of the multiple companies to the user object in the first user path responsive to determining that the user object is linked to the multiple companies;
verify a data match for the first company of the user object at the initial node responsive to locking the first company to the user object; and
advance the user object to a subsequent node of the first user path responsive to verifying the data match for the first company of the user object.

* * * * *